United States Patent
Dawes et al.

(10) Patent No.: US 11,843,571 B2
(45) Date of Patent: Dec. 12, 2023

(54) SYSTEMS AND METHODS FOR DISPLAYING A NOTIFICATION AT AN AREA ON A DISPLAY SCREEN THAT IS WITHIN A LINE OF SIGHT OF A SUBSET OF AUDIENCE MEMBERS TO WHOM THE NOTIFICATION PERTAINS

(71) Applicant: Rovi Guides, Inc., San Jose, CA (US)

(72) Inventors: Charles Dawes, Ryton (GB); Takeaki Obara, Tokyo (JP)

(73) Assignee: Rovi Guides, Inc., San Jose, CA (US)

( * ) Notice: Subject to any disclaimer, the term of this patent is extended or adjusted under 35 U.S.C. 154(b) by 143 days.

(21) Appl. No.: 17/359,911

(22) Filed: Jun. 28, 2021

(65) Prior Publication Data

US 2021/0400007 A1 Dec. 23, 2021

Related U.S. Application Data

(63) Continuation of application No. 16/333,516, filed as application No. PCT/US2018/022112 on Mar. 13, 2018, now Pat. No. 11,082,383.

(51) Int. Cl.
*H04L 51/42* (2022.01)
*G06F 40/205* (2020.01)

(52) U.S. Cl.
CPC .......... *H04L 51/42* (2022.05); *G06F 40/205* (2020.01)

(58) Field of Classification Search
CPC ..... H04L 51/42; G06F 40/205; H04N 21/478; H04N 21/44218
See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |
| 7,165,098 B1 | 1/2007 | Boyer et al. |
| 7,742,340 B2 | 6/2010 | Mu et al. |
| 7,761,892 B2 | 7/2010 | Ellis et al. |
| 8,046,801 B2 | 10/2011 | Ellis et al. |
| 9,681,165 B1 | 6/2017 | Gupta et al. |
| 2002/0174430 A1 | 11/2002 | Ellis et al. |
| 2005/0251827 A1 | 11/2005 | Ellis et al. |
| 2010/0153885 A1 | 6/2010 | Yates |

(Continued)

FOREIGN PATENT DOCUMENTS

CN 104301507 A * 1/2015 ............. B60K 35/00

OTHER PUBLICATIONS

PCT International Search Report and Written Opinion in International Application No. PCT/US2018/022112, dated Nov. 12, 2018 (13 pages).

*Primary Examiner* — Kristie D Shingles
(74) *Attorney, Agent, or Firm* — HALEY GUILIANO LLP

(57) ABSTRACT

Systems and methods are disclosed herein for generating for display a notification to a plurality of users at a position within a display screen to which each user of the plurality of users is paying attention. Specifically, the media guidance application captures lines of sight of users who are paying attention to a display screen, based on which the media guidance application determines line-of-sight regions on the display screen that the users are paying attention to. The media guidance application then determines a display area that is noticeable to the users based on the respective line-of-sight regions on the display screen to display an electronic message.

16 Claims, 9 Drawing Sheets

(56) References Cited

U.S. PATENT DOCUMENTS

| | | | |
|---|---|---|---|
| 2010/0169905 A1* | 7/2010 | Fukuchi | H04N 21/4223 725/10 |
| 2011/0267374 A1 | 11/2011 | Sakata et al. | |
| 2012/0066705 A1* | 3/2012 | Harada | H04N 21/42201 725/12 |
| 2013/0242187 A1 | 9/2013 | Uchida et al. | |
| 2015/0348513 A1 | 12/2015 | Grimme et al. | |
| 2016/0132074 A1* | 5/2016 | Kim | G06F 1/1652 345/173 |
| 2017/0127011 A1* | 5/2017 | Okajima | G09G 5/14 |
| 2017/0332036 A1 | 11/2017 | Panchaksharaiah et al. | |
| 2017/0332139 A1 | 11/2017 | Blake et al. | |
| 2021/0058355 A1 | 2/2021 | Dawes et al. | |

* cited by examiner

SYSTEMS AND METHODS FOR DISPLAYING A NOTIFICATION AT AN AREA ON A DISPLAY SCREEN THAT IS WITHIN A LINE OF SIGHT OF A SUBSET OF AUDIENCE MEMBERS TO WHOM THE NOTIFICATION PERTAINS

CROSS-REFERENCE TO RELATED APPLICATIONS

This application is a continuation of U.S. patent application Ser. No. 16/333,516, filed Mar. 14, 2019, which is a national stage application under 35 U.S.C. § 371 of International Application PCT/US2018/022112, filed Mar. 13, 2018, which is hereby incorporated by reference herein in its entirety.

BACKGROUND

Some existing media systems may receive an electronic communication such as a mobile message, a social media post, and/or the like, and may display the message on the display screen of user equipment. For example, the electronic communication may be displayed as a news ticker on the display screen when a media asset is being played. In some existing systems having a large display screen, the display screen can be divided into grids of sub-screens, each of which may be used to display a different media asset. In that case, each member of an audience group may pay attention to a sub-screen that is playing a program that the member is interested in. If an electronic communication is displayed at an area on the display screen that is a distance away from the sub-screen that the audience member is paying attention to, the audience member is likely not to notice the electronic communication and thus may miss an important notification to the audience member.

SUMMARY

The advancement of digital transmission of media content has increased the amount of data that can be transmitted. In particular, media systems may transmit metadata that includes detailed information about media content. This metadata may include descriptions and tags to important events within the media asset. While this information, by itself, is not useable for displaying to a human user, computer processors can read and interpret this information. However, while computer processors may read and interpret this information, and generate media content for display that may be useable by a human user (e.g., output media content on a display screen in a human recognizable format), these systems still fail to solve the aforementioned problem when implemented in computer systems because: (i) different users may be using different devices (and may not see an electronic message displayed on a particular device); and (ii) the display screen may be too large and not all users may pay attention to the displayed message.

Accordingly, to overcome the problems created when displaying a message to multiple users while the multiple users are paying attention to a display screen in computer systems, systems and methods are disclosed herein for generating for display a notification to a plurality of users at a position within a display screen to which each user of the plurality of users is paying attention. Specifically, the media guidance application captures lines of sight of users who are paying attention to a display screen, based on which the media guidance application determines line-of-sight regions on the display screen that the users are paying attention to. The media guidance application then determines a display area that is noticeable to the users based on the respective line-of-sight regions on the display screen to display an electronic message. Accordingly, even if a group of users are paying attention to different spots on a large screen, electronic messages can be displayed at a noticeable position on screen to capture the attention of the group of users.

In some aspects of the disclosure, the media guidance application may obtain a plurality of indicators, and each indicator from the plurality of indicators is indicative of a respective location of a respective user from a plurality of users. The media guidance application may then determine whether the plurality of users are within proximity of the display screen based on the plurality of indicators (e.g., GPS information, etc.). In response to determining that the plurality of users are within proximity of the display screen, the media guidance application may monitor electronic messages (e.g., a social media post, a mobile message, a phone call indication, a voicemail message, a news feed, and/or the like), from a remote data source.

In response to receiving from the server the electronic message, the media guidance application may identify that the electronic message is relevant to a subset of users from the plurality of users.

In some embodiments, the media guidance application may identify the subset of relevant users based on the intended recipients of the electronic communication. Specifically, the media guidance application may determine a type of the electronic message when the electronic message corresponds to a social communication. In response to determining that the electronic message does not correspond to a type of social communication, the media guidance application may determine whether the electronic message is relevant to one or more users based on the content of the message. For example, the media guidance application may extract a keyword from the electronic message, and may retrieve a user interest profile. The media guidance application may then compare the keyword with the respective user interest profile. The media guidance application may generate, based on the comparing, a respective relevance score corresponding to the respective user, e.g., by computing an overlapping percentage between the user's interested topics and the keywords. In response to determining that the respective relevance score is greater than a relevance threshold, the media guidance application may identify that the electronic message is relevant to the respective user, and may then add the respective user to the subset of users that the electronic message is relevant to.

The media guidance application may then determine a respective line of sight between each user from the subset of users and the display screen. For example, the media guidance application may engage imaging circuitry to capture an image of the positions and gestures of the users to determine the line of sight for each user, and the respective projected line-of-sight region on the display screen. The media guidance application may then determine a display area that approximates a region noticeable to the subset of users based on the set of line-of-sight regions on the display screen. In this way, the electronic message can be displayed at the determined display area that is noticeable to the users who are paying attention to the display screen.

In some embodiments, the media guidance application may determine whether the set of line-of-sight regions have an intersection area. In response to determining that the set of line-of-sight regions have an intersection area, the media guidance application may determine the display area to be overlapping with the intersection area. The media guidance application may adjust the position of the determined display area relative to each line-of-sight region from the line-of-sight regions based on the respective relevance score to display the received message. For example, when a line-of-sight region has a relevance score greater another region, the position of the display area is shifted towards the region having a greater relevance score.

In some embodiments, in response to determining that the set of line-of-sight regions do not have an intersection area, the media guidance application may determine a respective center point for each line-of-sight region from the set of line-of-sight regions. The media guidance application may then compute a center-of-mass point of the set of center points corresponding to the set of line-of-sight regions. For example, each respective center point is weighted by the respective relevance score, e.g., as the "mass" corresponding to the respective region. Upon determining the center-of-mass point, the media guidance application may determine the position of the display area to be centered at the center-of-mass point.

The media guidance application may generate for display the electronic message within the display area on the display screen in a manner that avoids covering important display content on the display screen. Specifically, the media guidance application may obtain a portion of a video frame being displayed on the display screen at a time when the electronic message is received. The media guidance application may then determine, via image analysis, an object from the portion of the video frame. For example, the media guidance application may identify a human face, a soccer ball, part of a tree, and/or the like from the portion of the video frame based on pattern recognition. The media guidance application may then adjust or position the display area away from the portion when the object is an important element (e.g., a soccer ball in the soccer game). In this way, the media guidance application avoids interrupting the user viewing experience by accidentally blocking an important scene on the display screen while displaying the electronic message.

In some embodiments, the media guidance application may determine a background region that covers the display area. The media guidance application may extract a set of pixels of the background region and obtain a first set of visualization parameters corresponding to the set of pixels. For example, the media guidance application may obtain the hue, saturation and lightness parameters associated with the set of pixels, which indicate the color attribute of the background region. The media guidance application may compute an average visualization metric over the first set of visualization parameters. The media guidance application may then select a second set of visualization parameters in contrast to the average visualization metric. For example, when the background region has a dark color tone, the media guidance application may select a bright color for the display message.

In some embodiments, the media guidance application may retrieve metadata corresponding to the one or more media assets being displayed at a time when the electronic message is received, and extract a plurality of key terms from the metadata to determine whether the displayed content includes an important scene. The media guidance application may query an importance database based on the plurality of key terms to obtain a plurality of corresponding importance scores. The media guidance application may then compute an importance metric by taking an average of the plurality of corresponding importance scores. In response to determining that the importance metric is greater than an importance threshold, the media guidance application may determine that the user does not wish to be interrupted and may thus refrain from displaying the electronic message on the display screen at the time when the electronic message is received.

In some embodiments, the media guidance application may determine whether another display screen is connected. In response to determining that another display screen is connected, the media guidance application may generate for display the electronic message on the other display screen. In response to determining that no other display screen is connected, the media guidance application may display the message at a later time by periodically monitoring whether an important scene being displayed has lapsed.

In some embodiments, the media guidance application may refrain from displaying private messages on the display screen in front of a group of users to protect user privacy. Specifically, the media guidance application may determine an attribute of the electronic message that is indicative of a source of the message, e.g., a sender identifier of the electronic message, a content category of the electronic message, a domain name of the electronic message, a keyword from the electronic message, and/or the like. The media guidance application may then query a respective privacy setting table associated with each user profile for a respective privacy setting parameter corresponding to the attribute of the electronic message. For example, the privacy setting parameter may include an identifier of the source of the message, e.g., a message originated from a certain sender is listed as private. In response to determining that at least one respective privacy setting parameter meets a pre-defined privacy threshold, the media guidance application may refrain from displaying the electronic message at the display screen, and may transmit the electronic message to a user device.

In some embodiments, the media guidance application may terminate displaying the electronic message, e.g., upon a user request to dismiss the message, after a timeout, or when the user has looked away from the display area. Specifically, the media guidance application may determine whether a dismiss message is received within a pre-defined display time period and may remove the displayed electronic message from the display screen. In response to determining that no dismiss message is received after a pre-defined display time period, the media guidance application may re-capture, via the image capturing circuitry, an updated set of lines of sight associated with the subset of users, and re-determine an updated set of line-of-sight regions based on the updated set of lines of sight. In response to determining that none of the updated set of line-of-sight regions overlaps with the display area (e.g., the users have looked away from the displayed message), the media guidance application may remove the displayed electronic message from the display screen. In this way, the media guidance application may automatically remove the displayed message from the display screen in time to minimize the disruption of the user viewing experience.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
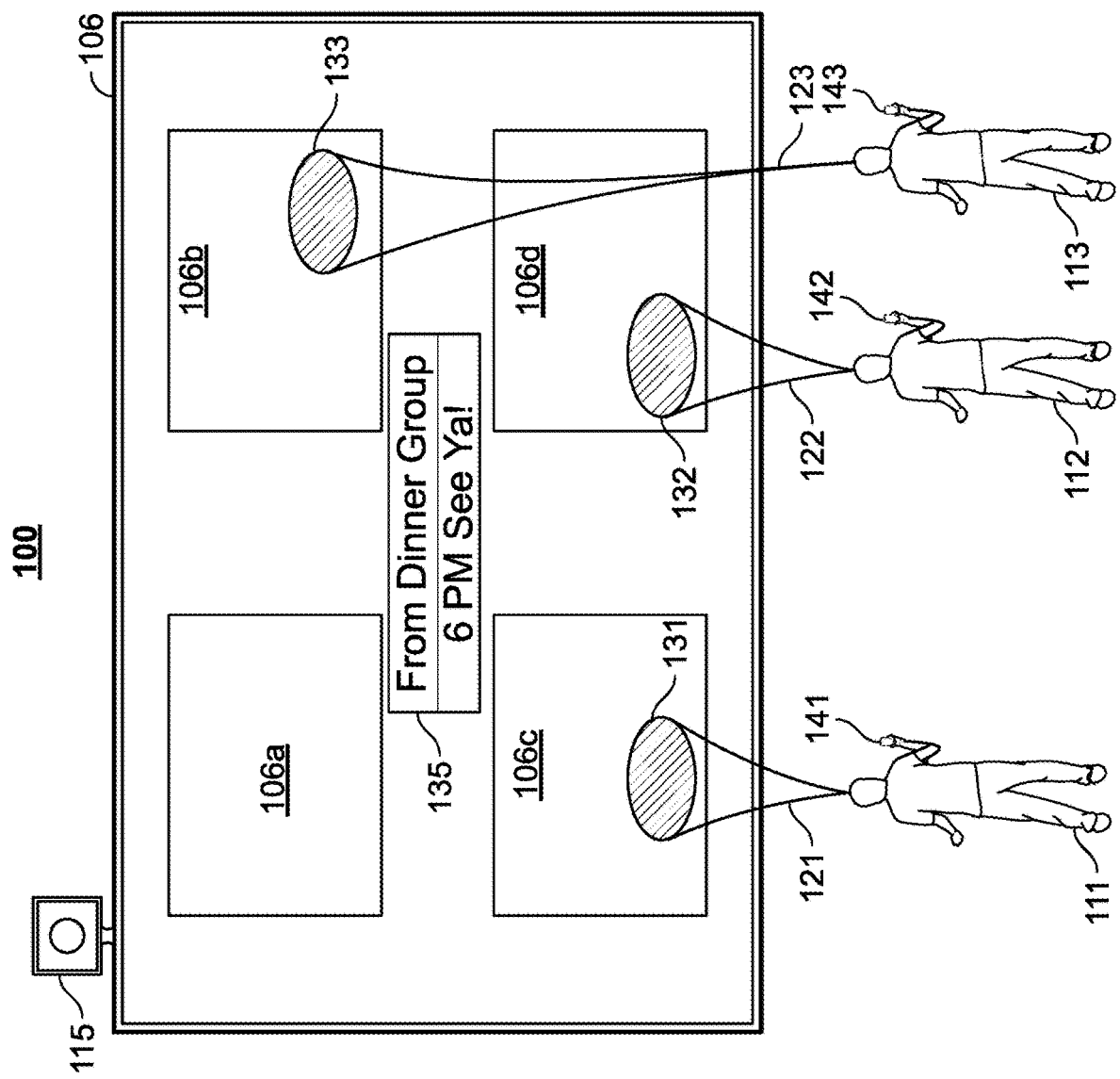
FIG. 1 depicts an illustrative example diagram for generating for display a notification to a plurality of users at a position within a display screen to which each user of the plurality of users is paying attention, in accordance with some embodiments of the disclosure.

Systems and methods are disclosed herein for generating a notification to a plurality of users at a position within a display screen to which each user of the plurality of users is paying attention.

For example, a media guidance application, which is implemented at a set-top box of user equipment, may be used to monitor that a group of users are present in proximity to a display screen of the user equipment. The media guidance application may then determine whether one or more users are paying attention to the displayed content on the display screen, e.g., by capturing a line of sight of each user. When the media guidance application receives a communication from a server, e.g., a social media post, or a mobile message, based on a respective area on the display screen that each user is focused on, the media guidance application may determine an area for displaying the electronic communication. For instance, the determined area can approximate an intersection of the areas that the users are paying attention to. For another instance, the determined area can be placed at the center between different areas that the users are paying attention to, if the different areas are scattered on the display screen.

As referred to herein, the term "line of sight" refers to a virtual straight line along which a user directs his or her vision. For example, when a user is staring at a spot on a display screen, the virtual straight line connecting the user's eye area and the spot on the display screen is the line of sight with the user.

As referred to herein, the term "line-of-sight region" refers to a geometric area that is projected by the line of sight on a planar surface. For example, the area that a user is paying attention to on a display screen following the user's line of sight is a line-of-sight region.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in VOD systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

It is to be noted that embodiments described herein may be implemented by a media guidance application implemented on a set-top box, or any other application that receives media guidance data and that can be configured to remotely communicate with a set-top box.

With the advent of the Internet, mobile computing, and high-speed wireless networks, users are accessing media on user equipment devices on which they traditionally did not use. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters" or providers" logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

FIG. 1 depicts an illustrative example diagram 100 for generating for display a notification to a plurality of users at a position within a display screen to which each user of the plurality of users is paying attention, in accordance with some embodiments of the disclosure. Diagram 100 shows user equipment 106 displaying one or more media assets. For example, the user equipment may include one or more grids of sub-screens 106a-106d; each of the sub-screens may display a different media asset, e.g., a sports event from a live channel may be displayed at sub-window 106a, while an on-demand movie may be displayed at sub-window 106b, and/or the like.

Diagram 100 further shows a group of users 111-113 in proximity to the user equipment 106, each of the users 111-113 operating a respective user device 141-144. Specifically, the media guidance application may obtain a plurality of indicators, and each indicator from the plurality of indicators is indicative of a respective location of a respective user from a plurality of users. The media guidance application may then determine whether the plurality of users are within proximity of the display screen based on the plurality of indicators. For example, the media guidance application may obtain GPS coordinates of the user devices 141-143, based on which the media guidance application determines whether the users 111-113 are within proximity to the user equipment 106. For another example, the media guidance application may query the communication stack, e.g., via Bluetooth, Wi-Fi, etc., for available user devices 141-143 within the local area network range, to determine whether any of the devices 141-143 is nearby. In another embodiment, the media guidance application may engage a camera 115 that is installed at the front of the user equipment 106 to take an image of the scene within the room where the user equipment 106 is housed, based on which the media guidance application may perform face recognition to identify which users are present in the same room. Within embodiments, the media guidance application may periodically, intermittently or constantly monitor the locations of the group of users 141-143, and thus determine whether these users 111-113 are present with the user equipment 106 accordingly.

The media guidance application may then determine an electronic message is received and needs to be displayed. Specifically, in response to determining that the plurality of users are within proximity of the display screen, the media guidance application may monitor electronic messages from a server. For example, the media guidance application may receive a social media post, a mobile message, a phone call indication, a voicemail message, a news feed, and/or the like, from a remote data source (e.g., 718 via communications network 714 in FIG. 7).

The media guidance application may then determine whether the received electronic communication is relevant to the present users, e.g., 111-113. Specifically, in response to receiving from the server the electronic message, the media guidance application may identify that the electronic message is relevant to a subset of users from the plurality of users.

In some embodiments, the media guidance application may identify the users who are the intended recipients of the electronic communication. Specifically, the media guidance application may determine a type of the electronic message. For example, the electronic message may be a social media post, a social media chat message, a short message service (SMS) message, a phone call, a voicemail, an instant message, an electronic mail, a new feed notification, a subscription notification, and/or the like. In some implementations, the media guidance application may extract a source identifier of the electronic message, based on which the media guidance application may identify the type of the message. For example, when the electronic message is originated from a social media server, an electronic mail server, a cellular service center server, and/or the like, the message is determined as a type of social communication. For another example, when the electronic message is originated from a publication server, a web server, and/or the like, the message is determined as not a type of social communication. In response to determining that the electronic message corresponds to a type of social communication, e.g., a social media chat message, a short message service (SMS) message, a phone call, a voicemail, an instant message, an electronic mail, and/or the like, the media guidance application may identify one or more intended recipients of the social communication. For example, the media guidance application may identify the recipient of an electronic mail, a recipient caller identifier of a phone call or voicemail, the members of a social media group chat message, and/or the like. The media guidance application may then determine a subset of users from the plurality of users corresponding to the one or more intended recipients of the social communication. In the respective example shown in FIG. 1, when the electronic message is a social media group chat message, e.g., "6 PM see you!" from the chat group "Dinner Group" 135, the media guidance application may determine that the electronic message is relevant to users 111-113 when identifiers associated with the social media group chat message 135 identify users 111-113.

In some embodiments, in response to determining that the electronic message does not corresponds to a type of social communication, the media guidance application may determine whether the electronic message is relevant to one or more users based on the content of the message. Specifically, the media guidance application may extract a keyword from the electronic message. For example, for a news headline message "Hanyu leads in Men's Free Skate," the media guidance application may extract keywords "Hanyu," "Men's," "Free Skate," and/or the like. For each user from the plurality of users, the media guidance application may retrieve a respective user interest profile, and compare the keyword with the respective user interest profile. For example, the user interest profile may include topic indicators that the user is interested in, such as sports, figure skating, Winter Olympics, and/or the like. The media guidance application may generate, based on the comparing, a respective relevance score corresponding to the respective user, e.g., by computing an overlapping percentage between the user interested topics and the keywords. In response to determining that the respective relevance score is greater than a relevance threshold, the media guidance application may identify that the electronic message is relevant to the respective user, and may then add the respective user to the subset of users that the electronic message is relevant to.

The media guidance application may then determine whether the relevant users, e.g., 111-113, are actually paying attention to the displayed content at the user equipment 106. For example, one or more, or the entirety of the group of users 111-113 are actually paying attention to the display screen of the user equipment 106. If a user is not paying attention to the display screen of the user equipment 106, he or she may not notice any electronic communication being displayed on the display screen. To determine whether a user is actually paying attention, the media guidance application may determine a respective line of sight between each user from the subset of users and the display screen. For example, the media guidance application may engage a camera 115 that is installed at the front of the user equipment 106 to capture an image of the users 111, 112 and 113. Based on an angle of the head position of each user, the media guidance application may determine a line of sight 121, 122 and 123 corresponding to each user 111, 112 and 113. In some embodiments, the camera 115 is configured to capture a high-definition image of the users 111-113, based on which the media guidance application may analyze the center of the pupil of each user to determine the lines of sight 111-113. For another example, the media guidance application may detect a position of a user device 141-143 and the position of any obstacles between the user device and the display screen. The media guidance application may then generate a straight line between the user device and the display screen, which is unblocked by any obstacles in between, representing the vision range of a user. Further additional embodiments of tracking whether a user is paying attention to a displayed media asset are discussed in commonly-assigned and co-pending U.S. application Ser. Nos. 15/200,216 and 15/200,634, both filed on Jul. 1, 2016, which are hereby expressly incorporated herein by reference in their entirety.

The media guidance application may then determine a set of line-of-sight regions 131, 132 and 133 on the display screen of the user equipment 106. For example, each region from the set of line-of-sight regions corresponds to an area that the respective line of sight 121, 122 and 123 points to on the display screen.

The media guidance application may then determine an area for displaying the received electronic communication such that the users 111-113 may notice. Specifically, the media guidance application may determine a display area that approximates a region noticeable to the subset of users based on the set of line-of-sight regions on the display screen. Example embodiments of displaying a notification at a gaze point of a user are discussed in U.S. Pat. No. 7,742,340, issued on Jun. 22, 2010, which is hereby expressly incorporated herein by reference in its entirety.

Figure 2:
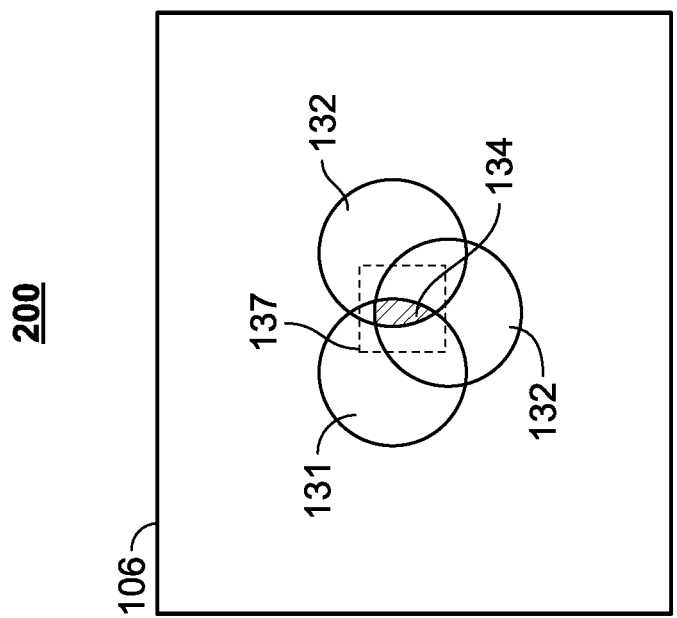

In some embodiments, the media guidance application may determine a position to display the electronic message based on how relevant the message is to each user 111-113. Specifically, the media guidance application may determine whether the set of line-of-sight regions have an intersection area. For example, as shown in FIG. 2, the set of line-of-sight regions 131-132 have an intersection area 134. In response to determining that the set of line-of-sight regions have an intersection area, the media guidance application may determine the display area to be overlapping with the intersection area. For example, the media guidance application may determine that the display area 137 is positioned around or centered at the intersection area 134. In some implementations, the media guidance application may adjust the position of the determined display area relative to each line-of-sight region from the line-of-sight regions based on the respective relevance score. For example, when the line-of-sight region 132 has a relevance score greater than those of the regions 131 and 132, the position of display area 137, e.g., the coordinates of the four corners of the display area 137 within the display screen, is shifted towards the region 132 such that the display area 137 overlaps with the region 132 at a larger area proportional to the relevance score corresponding to the region 132.

Figure 3:
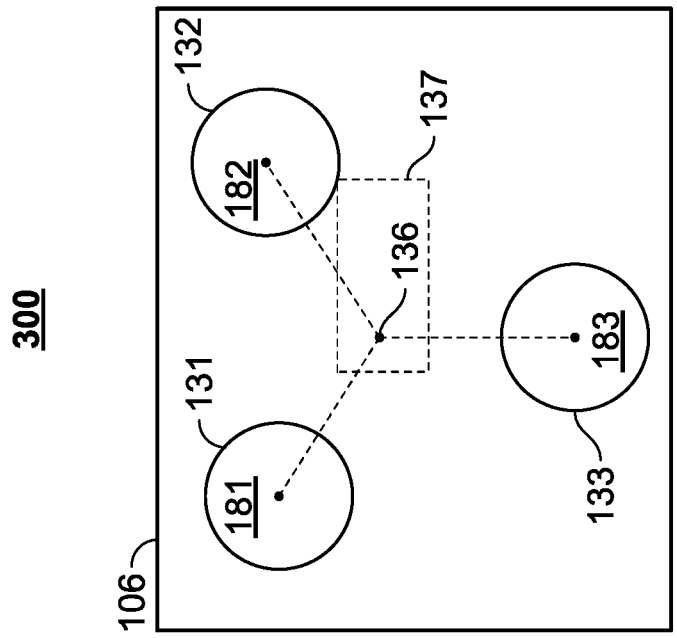
FIGS. 2-3 provide example block diagrams illustrating different scenarios of determining a display area that is noticeable to a set of users paying attention to a display screen, according to an embodiment described herein.

In some embodiments, the line-of-sight regions may not have a common intersection. For example, as shown in FIG. 3, the line-of-sight regions 131-133 are scattered within the display screen, and do not overlap. In response to determining that the set of line-of-sight regions do not have an intersection area, the media guidance application may determine a respective center point (e.g., 181-183) for each line-of-sight region from the set of line-of-sight regions. For another example, when a subset of the line-of-sight regions have an intersection area but another subset of the line-of-sight regions do not overlap with the intersection area, the media guidance application may determine the center of the intersection area, and the centers of the other non-overlapping line-of-sight regions. The media guidance application may then compute a center-of-mass point of the set of center points corresponding to the set of line-of-sight regions. For example, each respective center point 181-183 is weighted by the respective relevance score corresponding to the respective region 131-133, representing the "mass" of the region. Upon determining the center-of-mass point 136, the media guidance application may determine the position of the display area to be centered at the center-of-mass point. For example, coordinates of the four corners of the display area 137 are computed based on the coordinates of the center point 136, based on a selected size of the display area 137.

In some embodiments, when the line-of-sight regions of the users are scattered with no overlapping area (e.g., see 131-133 in FIG. 3), the media guidance application may generate duplicate display messages to be displayed at different display areas on the display screen. Each display area may overlap with at least one line-of-sight region of a user such that the displayed message at the respective display area is noticeable to the user.

The media guidance application may generate for display, the electronic message within the display area on the display screen. In some implementations, the media guidance application may select the shape and size of the display area 137 based on a type of the message, a text length of the message, and/or the like. For example, different types of the message, e.g., a social media group chat message, a mobile message, a news feed, and/or the like, may be displayed with different display templates.

In some embodiments, the media guidance application may adjust the determined display area (e.g., 137 in FIGS. 2-3) to avoid the display area covering an important portion of the display screen. Specifically, the media guidance application may obtain a portion of a video frame being displayed on the display screen at a time when the electronic message is received. The portion corresponding to the determined position of the display area, e.g., 137 in FIGS. 2-3. The media guidance application may then determine, via image analysis, an object from the portion of the video frame. For example, the media guidance application may identify a human face, a soccer ball, part of a tree, and/or the like from the portion of the video frame based on pattern recognition. To determine whether the object is an important element of the displayed scene in the video frame, the media guidance application may determine a query term relating to the object, e.g., "soccer," "Alex" (by facial recognition), "tree," and/or the like. Based on the query terms, the media guidance application may query an importance database, based on the query term, for an importance score. For example, the importance database may correspond to a specific media asset that is being displayed at the user equipment 106. When the media guidance application identifies the media asset is a soccer game by reading the title of the media asset, a query term of "soccer ball" may correspond to a high importance score from the importance database, as the object may be a moving soccer ball. When the media guidance application identifies the media asset is a reality television show, a query term of "Alex" may correspond to a high importance score from the importance database, as the query term "Alex" may indicate the object corresponds to the face of the character "Alex."

In some embodiments, the media guidance application may relate the metadata (e.g., subtitle, captioning, etc.) at the time when the electronic message is received to determine a nature of the object from the portion of the video frame. For example, when the media guidance application determines captioning data includes words such as "penalty," "foul" around the time when the electronic message is received, the media guidance application may determine that an object indicating a "ball" shape has a high importance score, as the position and movement of the soccer ball within a scene of a "penalty" kick is important.

In some embodiments, in response to determining that the importance score is greater than an importance threshold, the media guidance application may extract pixels corresponding to the object. The media guidance application may then determine a center of the object and a size of the object based on the extracted pixels. For example, the media guidance application may identify an area of a displayed "soccer ball," or a human face. The media guidance application may then select a radius based on the size of the object, and then adjust the display area (e.g., 137 in FIGS. 2-3) to be outside an area defined by the center of the object and the selected radius. Further details of determining an object on the screen not to be covered by any overlay are discussed in commonly-owned and co-pending U.S. nonprovisional application Ser. No. 15/095,868, filed on Apr. 11, 2016, which is hereby expressly incorporated herein by reference in its entirety.

In some embodiments, the media guidance application may display the electronic message with contrasting visual effect to the background on the display screen such that the message is noticeable to the users. Specifically, the media guidance application may determine a background region that covers the display area. For example, the background region may be selected as centered at the display area 137 in FIGS. 2-3, with a larger size than the display area, e.g., 1.5, 2 times larger or any other sizes. The media guidance application may extract a set of pixels of the background region and obtain a first set of visualization parameters corresponding to the set of pixels. For example, the media guidance application may obtain the hue, saturation and lightness parameters associated with the set of pixels, which indicate the color attribute of the background region. The media guidance application may compute an average visualization metric over the first set of visualization parameters, e.g., by taking an average hue, saturation and lightness parameters of the pixels. The media guidance application may then select a second set of visualization parameters in contrast to the average visualization metric. For example, when the background region has a dark color tone, the media guidance application may select a bright color for the display message. The media guidance application may then generate for display the electronic message based on the second set of visualization parameters at the display area such that the displayed electronic message has a contrasting visual effect with the background region.

In some embodiments, the media guidance application may determine whether the users 111-113 want to be disturbed before displaying the electronic message on the user equipment 106. Specifically, the media guidance application may retrieve metadata corresponding to the one or more media assets being displayed at a time when the electronic message is received, and extract a plurality of key terms from the metadata. For example, as described above, when the media asset being played is a soccer game, the media guidance application may extract key terms such as "penalty," "foul," etc. The media guidance application may query an importance database, in a similar way as discussed above, based on the plurality of key terms, to obtain a plurality of corresponding importance scores. The media guidance application may then compute an importance metric by taking an average of the plurality of corresponding importance scores. In response to determining that the importance metric is greater than an importance threshold, the media guidance application may determine that the user does not wish to be interrupted and may thus refrain from displaying the electronic message on the display screen at the time when the electronic message is received.

In some implementations, when the media guidance application displays different media assets at different sub-windows (e.g., 106a-d in FIG. 10), the media guidance application may compute an importance metric associated with each sub-window. In this case, the media guidance application excludes line-of-sight regions that correspond to a sub-window with a high importance metric. For example, if the importance metric associated with sub-window 106c is greater than the importance threshold, but the importance metrics associated with sub-windows 106b and 106d are lower than the threshold, the media guidance application only includes the line-of-sight regions 132 and 133 to determine the display area.

In some embodiments, the media guidance application may refrain from disturbing the user's viewing experience on the user equipment 106. Specifically, in response to determining that the importance metric is greater than an importance threshold, the media guidance application may determine whether another display screen is connected. In response to determining that another display screen is connected, the media guidance application may generate for display the electronic message on the other display screen. In response to determining that no other display screen is connected, the media guidance application may display the message at a later time by periodically monitoring whether an important scene being displayed has lapsed. Specifically, the media guidance application may determine another importance metric at a later time after a pre-defined time lapse since the time when the electronic message is received. In response to determining that the other importance metric at the later time is lower than the importance threshold, the media guidance application may generate for display the electronic message on the display screen at the later time.

In some embodiments, the media guidance application may refrain from displaying private messages on the display screen of the user equipment 106 in front of all users 111-113 to protect user privacy. Specifically, the media guidance application may determine an attribute of the electronic message that is indicative of a source of the message. For example, the attribute of the electronic message includes a type of the electronic message (e.g., social media chat message, social media posts, mobile messages, etc.), a sender identifier of the electronic message, a content category of the electronic message, a domain name of the electronic message, a keyword from the electronic message, and/or the like. The media guidance application may then query a respective privacy setting table associated with each user profile for a respective privacy setting parameter corresponding to the attribute of the electronic message. For example, the privacy setting parameter may be a type of the message, e.g., an SMS message, a voicemail, an email, etc., are listed as private messages. For another example, the privacy setting parameter may include an identifier of the source of the message, e.g., a message originated from a certain sender is listed as private. For another example, the privacy setting parameter may include a keyword, e.g., an email message having the word "Confidential" is listed as private. In response to determining that at least one respective privacy setting parameter meets a pre-defined privacy threshold, the media guidance application may refrain from displaying the electronic message at the display screen, and may transmit the electronic message to a user device, e.g., devices 141-143.

In some embodiments, the media guidance application may terminate displaying the electronic message, e.g., upon a user request to dismiss the message, after a timeout, or when the user has looked away from the displayed area. Specifically, the media guidance application may determine whether a dismiss message is received within a pre-defined display time period (e.g., ten seconds, 15 seconds, etc.). For example, users 111-113 may operate user devices 141-143 to send a "dismiss" command. In response to determining that the dismiss message is received within the pre-defined display time period, the media guidance application may remove the displayed electronic message from the display screen. In response to determining that no dismiss message is received after a pre-defined display time period, the media guidance application may then determine whether the users 111-113 are still looking at the displayed message, or have looked away. Specifically, the media guidance application may re-capture, via the image capturing circuitry, an updated set of lines of sight associated with the subset of users. The media guidance application may re-determine an updated set of line-of-sight regions based on the updated set of lines of sight. The media guidance application may then determine whether at least one of the updated set of line-of-sight regions overlaps with the display area where the electronic message is displayed. In response to determining that none of the updated set of line-of-sight regions overlaps with the display area, the media guidance application may remove the displayed electronic message from the display screen.

In some embodiments, the media guidance application may reposition the electronic message at the display screen in real-time. Specifically, the media guidance application may periodically, intermittently or constantly re-capture an updated set of lines of sight associated with the subset of users, and in turn re-determine an updated set of line-of-sight regions based on the updated set of lines of sight. The media guidance application may then re-calibrate the display area based on the updated set of line-of-sight regions such that the display area is noticeable to the users 111-113 even if one or more users may look away from the message during the pre-defined display time.

Figure 4:
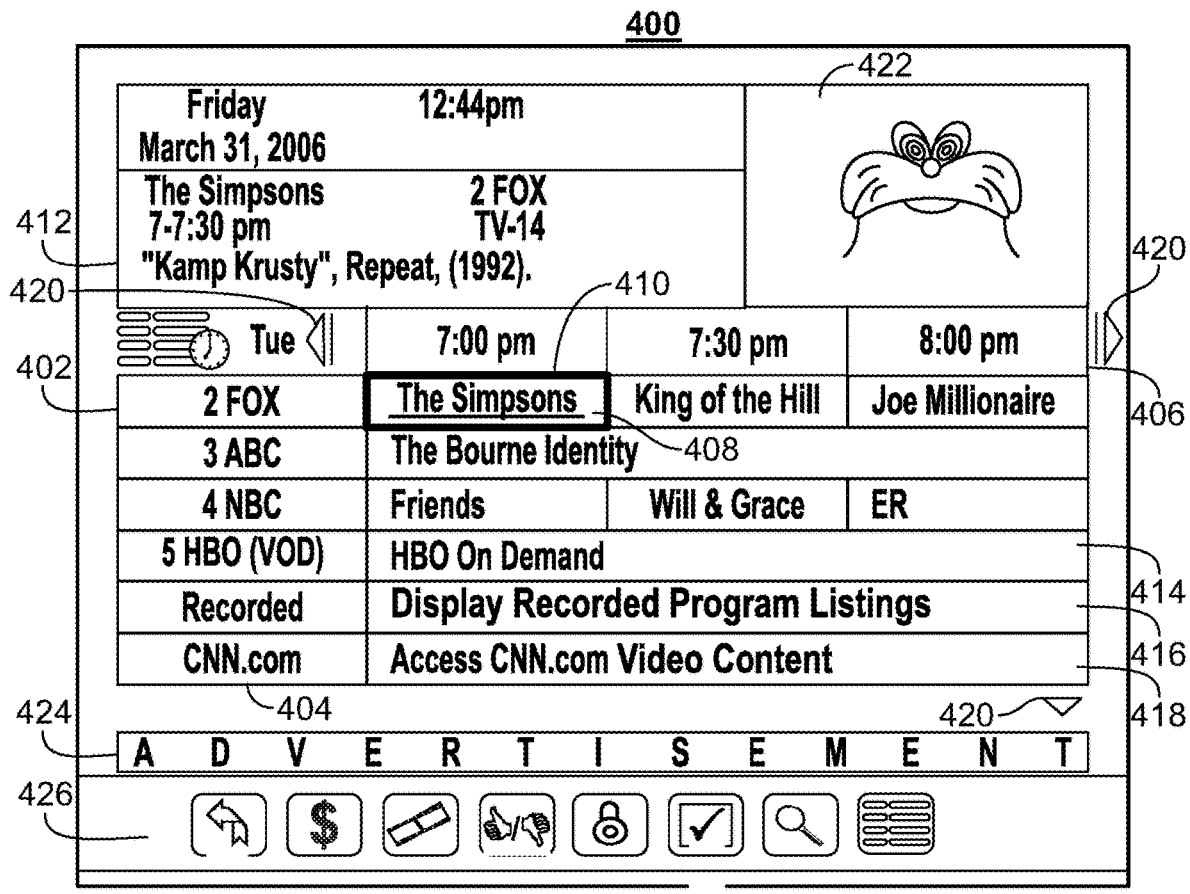
FIG. 4 shows an illustrative embodiment of a display screen that may be used to provide media guidance application listings and other media guidance information, in accordance with some embodiments of the disclosure.
Figure 5:
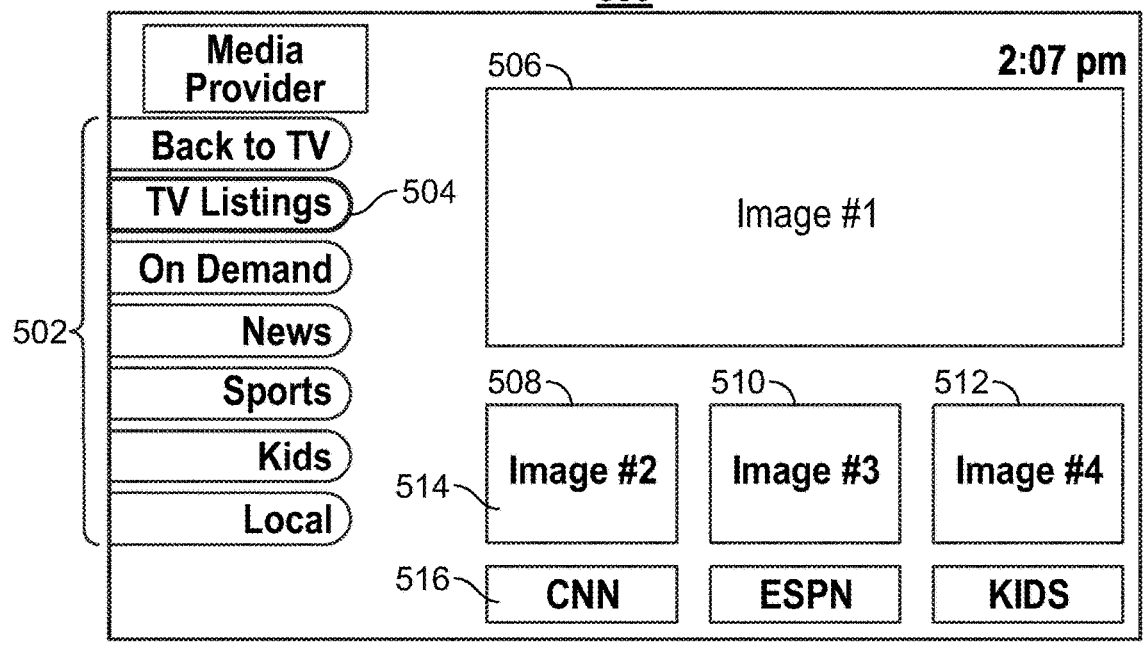
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform, e.g., user equipment 106 or the set-top box 120 in FIG. 1. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 4003 and Yuen et al. U.S. Pat. No. 6,239,794, issued May 49, 4001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 4D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
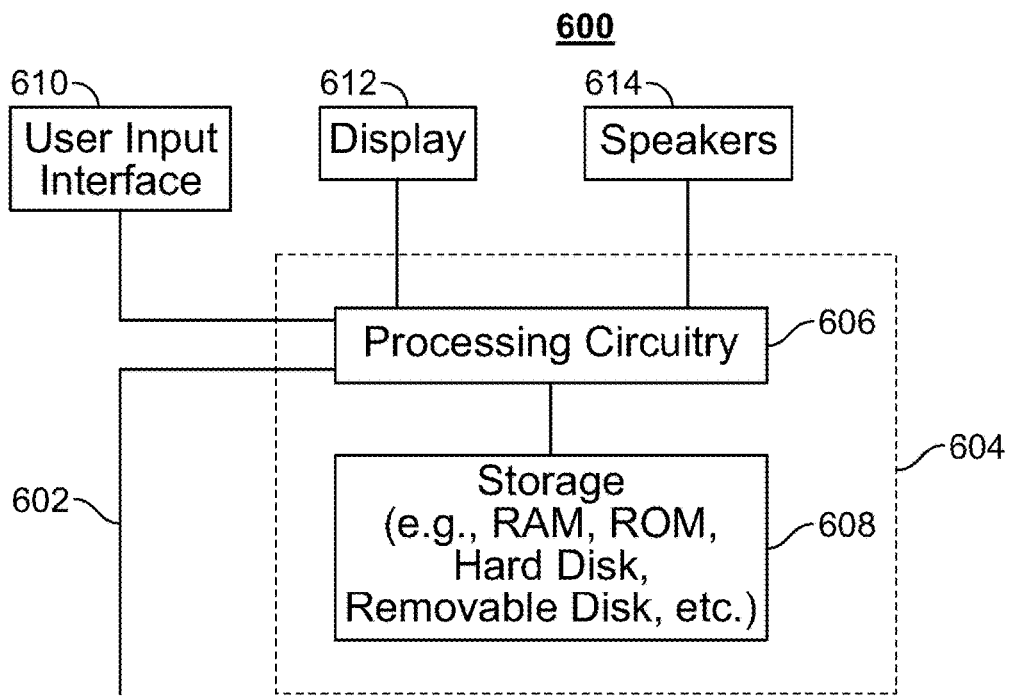
FIG. 6 is a block diagram of an illustrative user equipment (UE) device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 600 of FIG. 6 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

Figure 7:
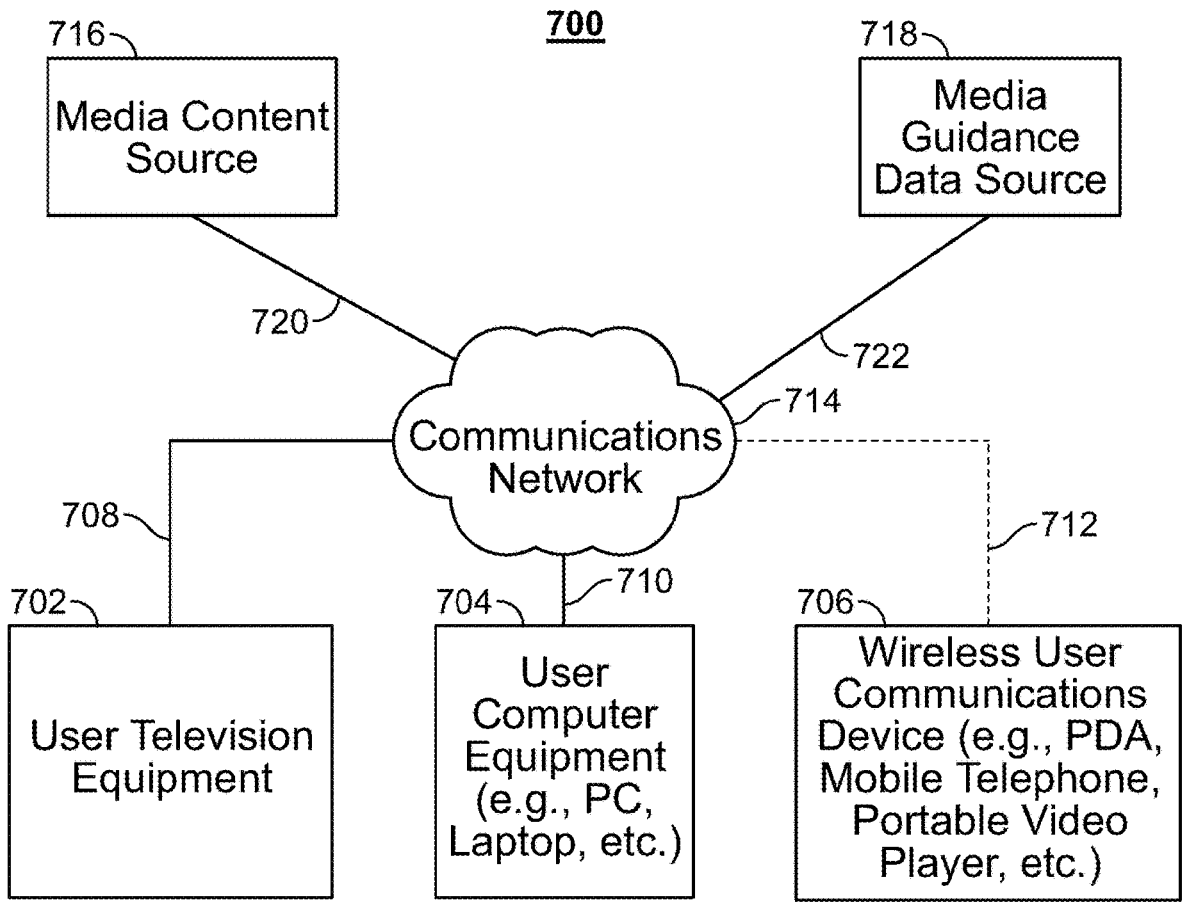
FIG. 7 is a block diagram of an illustrative media system in accordance with some embodiments of the disclosure.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source

716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users" equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 604 of a user equipment device 400. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

Figure 8:
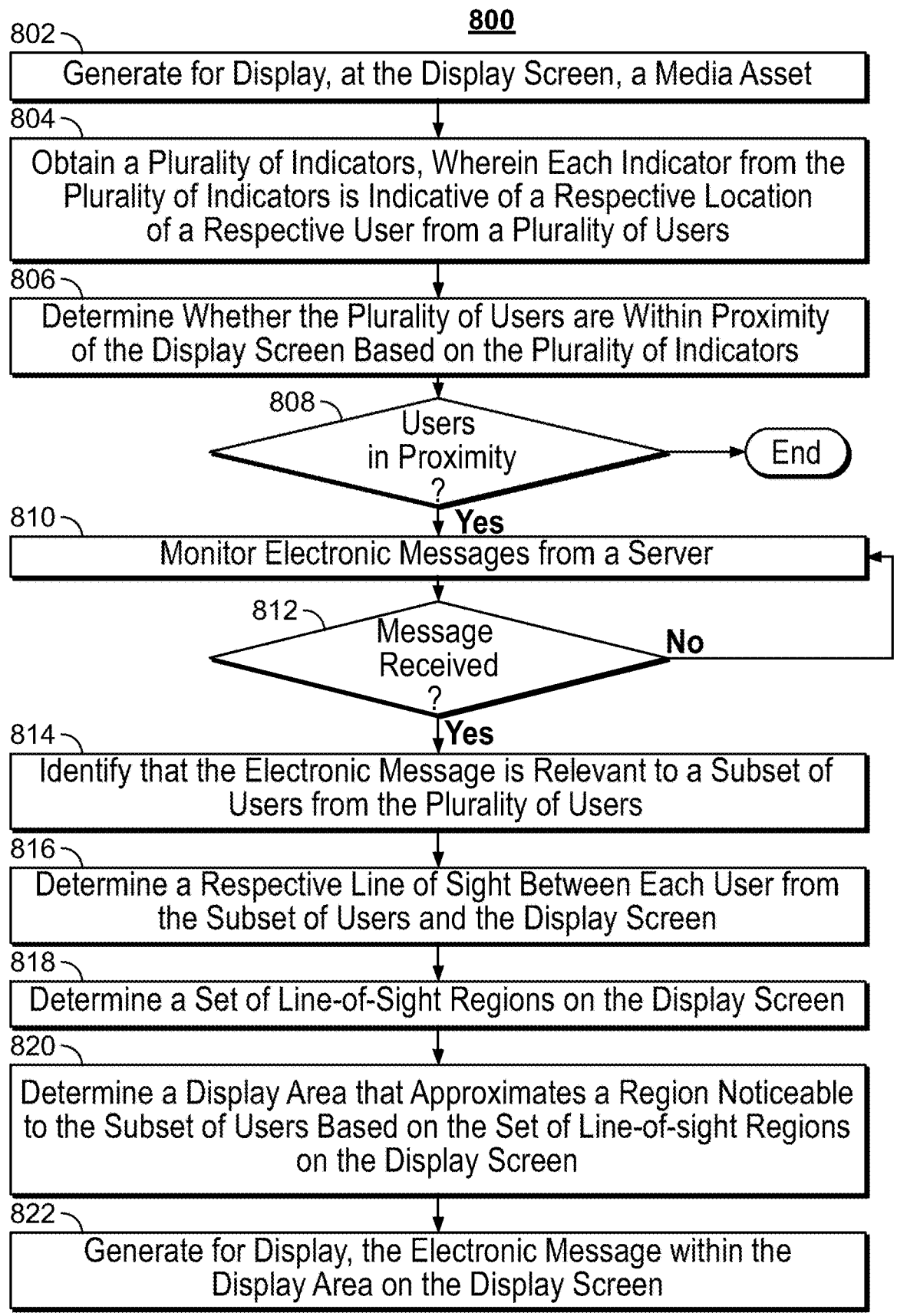
FIG. 8 depicts an illustrative flowchart of a process for generating for display a notification to a plurality of users at a position within a display screen to which each user of the plurality of users is paying attention, in accordance with some embodiments of the disclosure.

FIG. 8 depicts an illustrative flowchart of a process for generating for display a notification to a plurality of users at a position within a display screen to which each user of the plurality of users is paying attention, in accordance with some embodiments of the disclosure. Process 800 may be executed by control circuitry 604 (e.g., in a manner instructed to control circuitry 604 by the media guidance application). Control circuitry 604 may be part of user equipment (e.g., user equipment 106, which may have the functionality of any or all of user television equipment 702, user computer equipment 704, and/or wireless communications device 706), or of a remote server separated from the user equipment by way of communications network 714.

Process 800 begins at 802, where control circuitry 604 generates for display, at the display screen (e.g., display 612 in FIG. 6 of user equipment 106), a media asset. For example, control circuitry 604 receives a live media stream, or retrieves a previously stored media asset from data source 718 via communications network 714 in FIG. 7. At 804, control circuitry 604 obtains a plurality of indicators. Each indicator from the plurality of indicators is indicative of a respective location of a respective user from a plurality of users, e.g., GPS location, IP address of a user device, MAC address of a user device, and/or the like. At 806, control circuitry 604 determines whether the plurality of users are within proximity of the display screen based on the plurality of indicators. For example, control circuitry 604 queries a communication stack, e.g., via communications network 714 in FIG. 7, to identify whether the user devices are within the same local network.

At 808, when the users are in proximity of the display screen, process 800 proceeds to 810 where control circuitry 604 monitors electronic messages from a server. At 812, when no message is received, process 800 proceeds to 810. When an electronic message is received, process 800 proceeds to 814, where control circuitry 604 identifies that the electronic message is relevant to a subset of users from the plurality of users, as further described in FIG. 9. At 816, control circuitry 604 determines a respective line of sight between each user from the subset of users and the display screen. For example, control circuitry 604 engages an external imaging device such as a camera to capture an image of the users showing an angle of the users' vision. At 818, control circuitry 604 determines a set of line-of-sight regions on the display screen, e.g., by projecting the determined lines of sight on the display screen. At 820, control circuitry 604 determines a display area that approximates a region noticeable to the subset of users based on the set of line-of-sight regions on the display screen, as further described in FIG. 10. At 822, control circuitry 604 generates for display (e.g., via display 612 in FIG. 6), the electronic message within the display area on the display screen.

Figure 9:
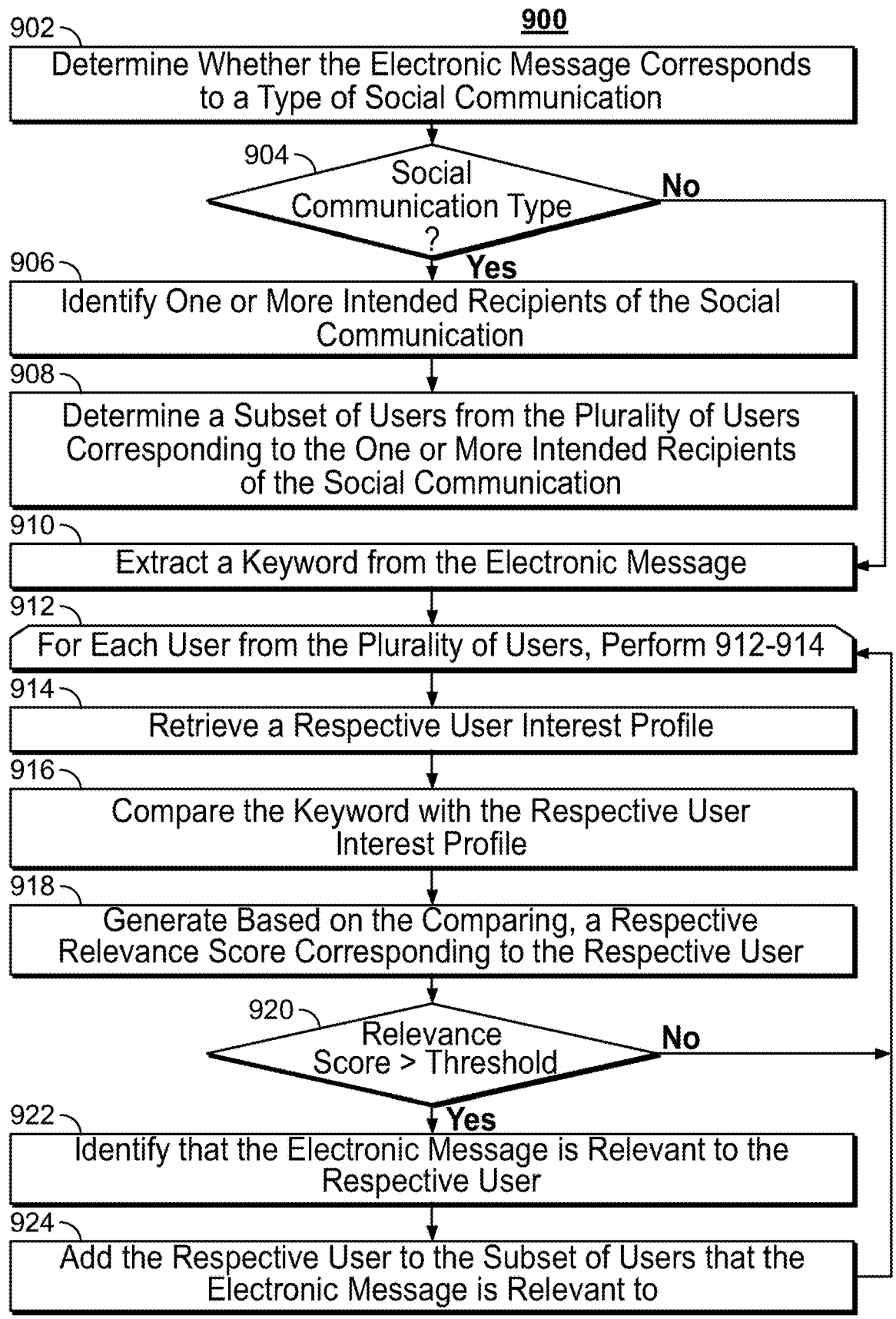
FIG. 9 depicts an illustrative flowchart of a process for identifying that the electronic message is relevant to a subset of users, in accordance with some embodiments of the disclosure.

FIG. 9 depicts an illustrative flowchart of a process for identifying that the electronic message is relevant to a subset of users (e.g., see 814 in FIG. 8), in accordance with some embodiments of the disclosure. Process 900 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 900 begins at 902, where control circuitry 604 determines whether the electronic message corresponds to a type of social communication. For example, control circuitry 604 parses a field in the electronic message to extract a source identifier of the message, based on which the control circuitry 604 determines whether the communication has a social communication type. At 904, when the electronic message has a social communication type, process 900 proceeds to 906, where control circuitry 604 identifies one or more intended recipients of the social communication, e.g., by parsing metadata associated with the electronic message. At 908, control circuitry 604 determines a subset of users from the plurality of users corresponding to the one or more intended recipients of the social communication.

At 904, when the electronic message does not have a social communication type, process 900 proceeds to 910, where control circuitry 604 extracts a keyword from the electronic message. At 912, for each user from the plurality of users, process 900 repeats 914-924 as follows. At 914, control circuitry 604 retrieves a respective user interest profile, e.g., from data source 718 via communications network 714 in FIG. 7. At 916, control circuitry 604 compares the keyword with the respective user interest profile. At 918, control circuitry 604 generates, based on the comparing, a respective relevance score corresponding to the respective user. At 920, when the relevance score is greater than a relevance threshold, process 900 proceeds to 922 where control circuitry 604 identifies that the electronic message is relevant to the respective user. At 924, control circuitry 604 adds the respective user to the subset of users that the electronic message is relevant to. For example, control circuitry 604 saves an identifier of the respective user at storage 608 in FIG. 6. At 920, when the relevance score is less than the relevance threshold, process 900 proceeds to 912 to repeat 914-924 with the next user from the plurality of users until the plurality of users are exhausted.

Figure 10:
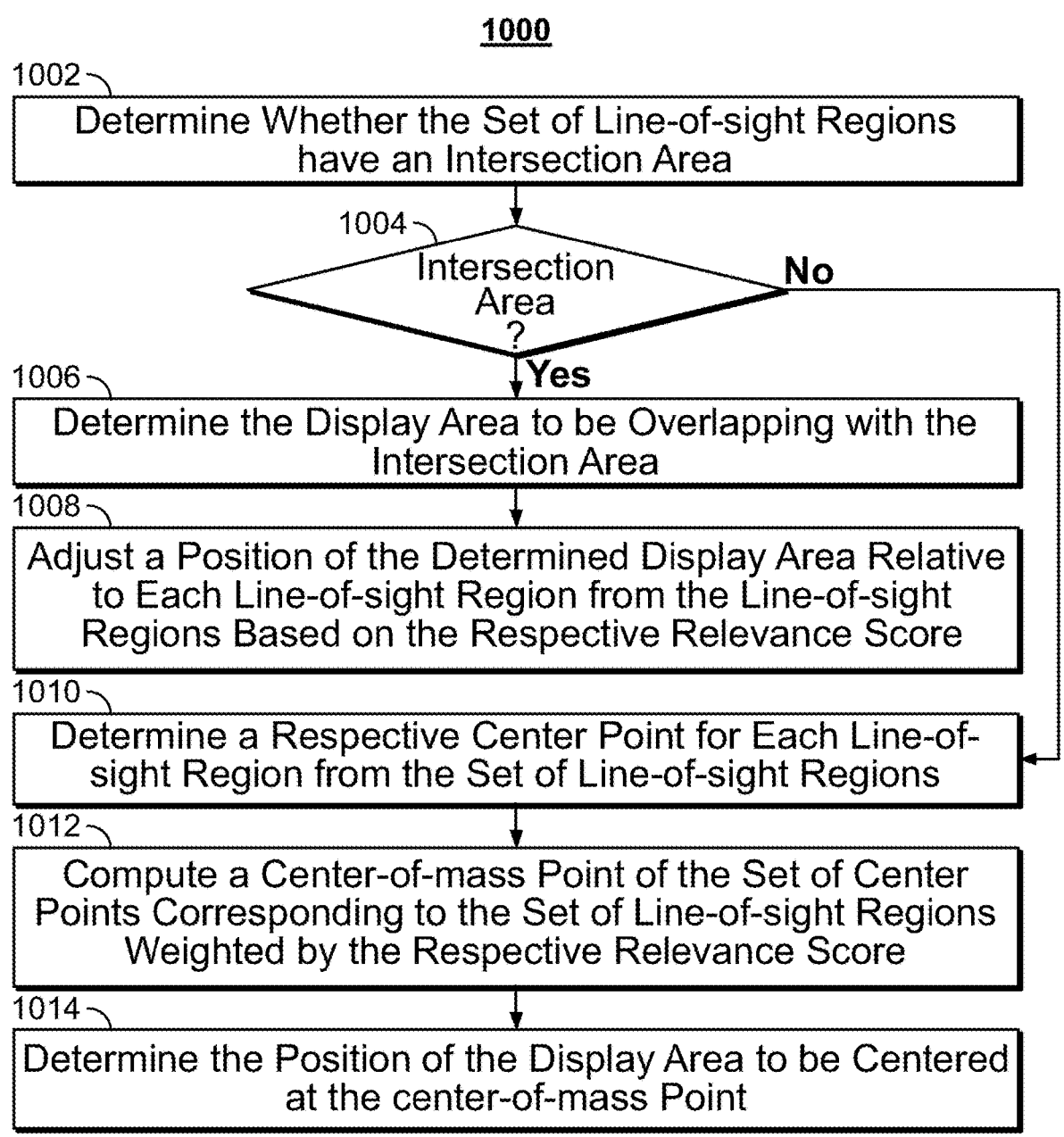
FIG. 10 depicts an illustrative flowchart of a process for determining a display area that approximates a region noticeable to the subset of users based on the set of line-of-sight regions on the display screen (e.g., see 820 in FIG. 8), in accordance with some embodiments of the disclosure.

FIG. 10 depicts an illustrative flowchart of a process for determining a display area that approximates a region noticeable to the subset of users based on the set of line-of-sight regions on the display screen (e.g., see 820 in FIG. 8), in accordance with some embodiments of the disclosure. Process 1000 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1000 begins at 1002, where control circuitry 604 determines whether the set of line-of-sight regions have an intersection area (e.g., 134 in FIG. 2). For example, control circuitry 604 computes coordinates of the pixels of each line-of-sight region (e.g., 131-133 in FIG. 2) to determine whether there is an intersection among all line-of-sight regions. At 1004, when there is an intersection area, process 1000 proceeds to 1006, where control circuitry 604 determines the display area to be overlapping with the intersection area. For example, control circuitry 604 computes the coordinates of the display area based on the intersection area. At 1008, control circuitry 604 adjusts a position of the determined display area relative to each line-of-sight region from the line-of-sight regions based on the respective relevance score.

At 1004, when there is no intersection area, process 1000 proceeds to 1010, where control circuitry 604 determines a respective center point (e.g., 181-183 in FIG. 3) for each line-of-sight region from the set of line-of-sight regions. At 1012, control circuitry 604 computes a center-of-mass point (e.g., 136 in FIG. 3) of the set of center points corresponding to the set of line-of-sight regions weighted by the respective relevance score. At 1014, control circuitry 604 determines the position of the display area (e.g., 137 in FIG. 3) to be centered at the center-of-mass point (e.g., 136 in FIG. 3).

Figure 11:
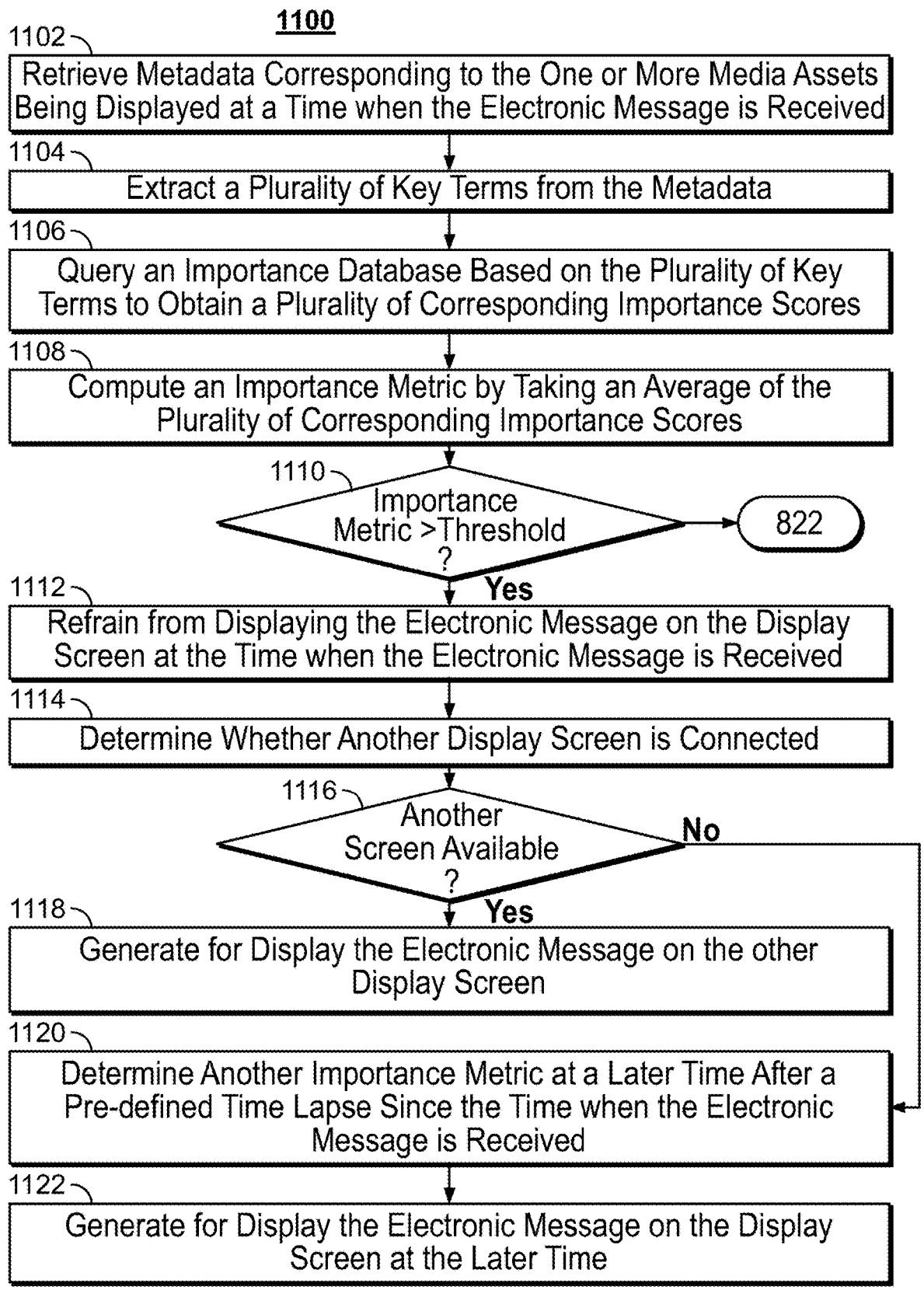
FIG. 11 depicts an illustrative flowchart of a process for avoiding displaying the message so as not to disrupt the user's viewing experience, in accordance with some embodiments of the disclosure.

FIG. 11 depicts an illustrative flowchart of a process for avoiding displaying the message so as not to disrupt the user's viewing experience, in accordance with some embodiments of the disclosure. Process 1100 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1100 begins at 1102, where control circuitry 604 retrieves metadata corresponding to the one or more media assets being displayed at a time when the electronic message is received. For example, control circuitry 604 retrieves metadata stored at storage 608 in FIG. 6. At 1104, control circuitry 604 extracts a plurality of key terms from the metadata. At 1106, control circuitry 604 queries an importance database, e.g., stored at storage 608 in FIG. 6, based on the plurality of key terms to obtain a plurality of corresponding importance scores. For example, control circuitry 604 transmits the query to the importance database stored at data source 718 via communications network 714 in FIG. 7. At 1108, control circuitry 604 computes an importance metric by taking an average of the plurality of corresponding importance scores.

At 1110, when the importance metric is greater than an importance threshold, process 1100 proceeds to 1112 where control circuitry 604 refrains from displaying the electronic message on the display screen at the time when the electronic message is received. At 1110, when importance metric is no greater than an importance threshold, control circuitry 604 proceeds to 822 in FIG. 8. At 1114, control circuitry 604 determines whether another display screen is connected. At 1116, when another screen is available, control circuitry 604 generates for display the electronic message on the other display screen at 1118. For example, control circuitry 604 sends the electronic message to the other display screen via the I/O path 602 in FIG. 6. Otherwise, when another screen is not available at 1116, control circuitry 604 determines another importance metric at a later time after a pre-defined time lapse since the time when the electronic message is received, at 1120. For example, control circuitry 604 compares the updated importance metric at a later time, and then generates for display the electronic message on the display screen at the later time when the importance metric is lower than the threshold, at 1122.

Figure 12:
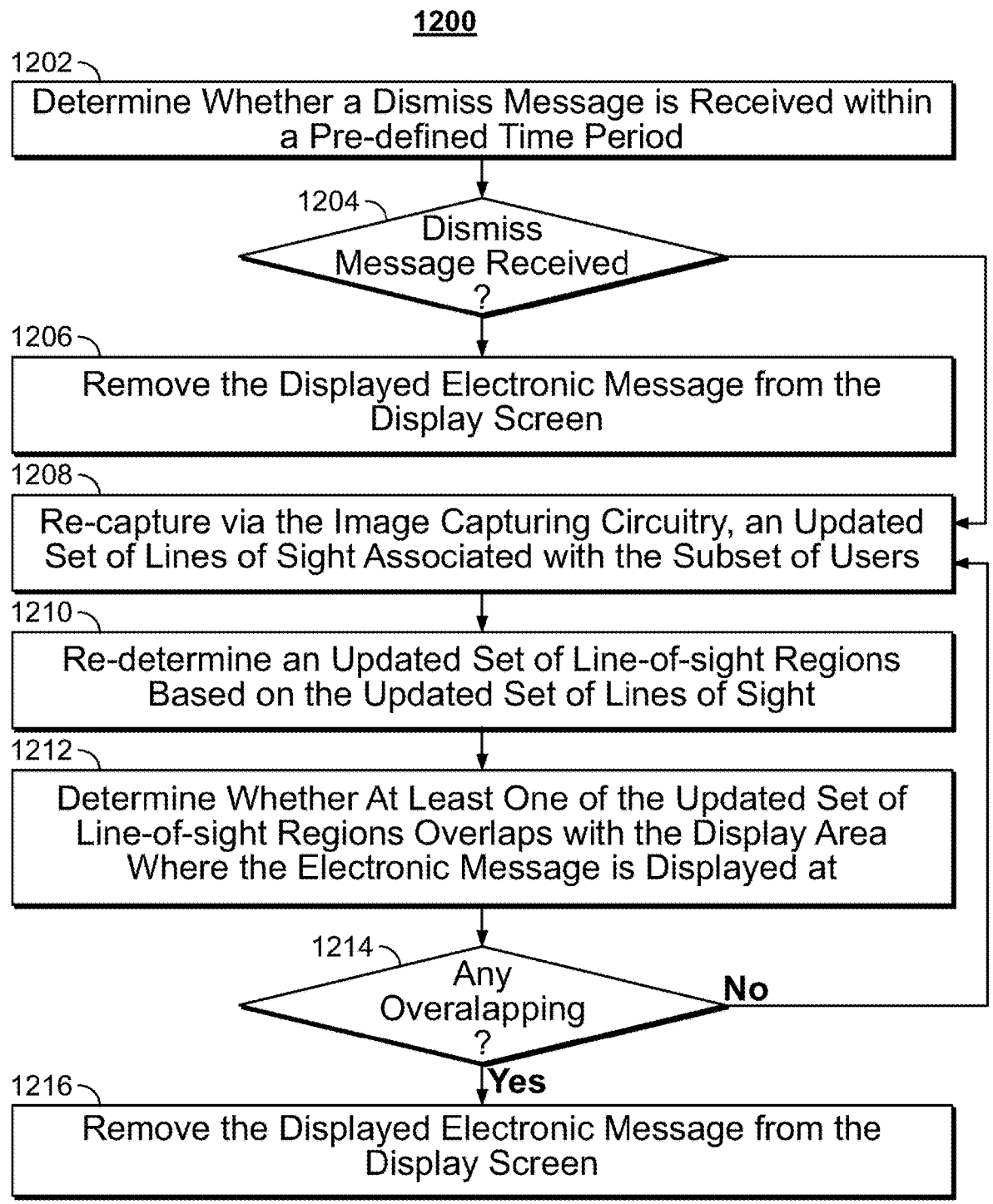
FIG. 12 depicts an illustrative flowchart of a process for dismissing a displayed electronic message, in accordance with some embodiments of the disclosure.

FIG. 12 depicts an illustrative flowchart of a process for dismissing a displayed electronic message, in accordance with some embodiments of the disclosure. Process 1200 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1200 begins at 1202, where control circuitry 604 determines whether a dismiss message is received within a pre-defined display time period. For example, control circuitry 604 receives via the I/O path 602 a user command to dismiss the displayed message. At 1204, when the dismiss message is received, control circuitry 604 removes the displayed electronic message from the display screen (e.g., via display 612). At 1204, when no dismiss message is received within a period of time, control circuitry 604 re-captures, via the image capturing circuitry, an updated set of lines of sight associated with the subset of users at 1208, and re-determines an updated set of line-of-sight regions based on the updated set of lines of sight at 1210. At 1212, control circuitry 604 determines whether at least one of the updated set of line-of-sight regions overlaps with the display area where the electronic message is displayed. At 1214, if none of the updated set of line-of-sight regions overlaps with the display area where the electronic message is displayed, indicating all users have looked away from the displayed message, control circuitry 604 removes the displayed electronic message from the display screen, at 1216. At 1214, if at least one of the updated set of line-of-sight regions overlaps with the display area where the electronic message is displayed, indicating at least one user is looking at the displayed message, process 1200 proceeds to 1208.

It should be noted that processes 800-1200 or any step thereof could be performed on, or provided by, any of the devices shown in, or described with respect to, FIGS. 1-3 and 6-7. For example, any of processes 800-1200 may be executed by control circuitry 604 (FIG. 6) as instructed by control circuitry implemented on user equipment 106 (FIG. 1), 702, 704, 706 (FIG. 6), and/or the like for generating and displaying a summary view of a media asset. In addition, one or more steps of processes 800-1200 may be incorporated into or combined with one or more steps of any other process or embodiment.

It is contemplated that the actions or descriptions of each of FIGS. 8-12 may be used with any other embodiment of this disclosure. In addition, the actions and descriptions described in relation to FIGS. 8-12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-12 could be used to perform one or more of the actions in FIGS. 8-12.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining a display area that is noticeable to the users based on the line-of-sight regions corresponding to the users, e.g., by processing circuitry 606 of FIG. 6. The processing circuitry, for instance, may be a general purpose processor, a customized integrated circuit (e.g., an ASIC), or a field-programmable gate array (FPGA) within user equipment 600, media content source 716, or media guidance data source 718. For example, the attributes of media assets, may be stored in, and retrieved from, storage 608 of FIG. 6, or media guidance data source 718 of FIG. 7. Furthermore, processing circuitry, or a computer program, may update configuration data of the media guidance application, which may be stored within storage 608 of FIG. 6 or media guidance data source 718 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A computer-implemented method comprising:
   determining that a first user and a second user are viewing a display;
   identifying a notification that is relevant to the first user and the second user;
   determining a first line of sight associated with the first user and a second line of sight associated with the second user, wherein the first line of sight and the second line of sight point to a first region and a second region of the display, respectively;
   determining whether a third region of the display at which the first region and the second region overlap is present; and
   in response to determining the presence of the third region of the display at which the first region and the second region overlap, generating for display the notification in the third region of the display;
   in response to determining there is no third region of the display at which the first region and the second region overlap:
      determining a center point between the first region and the second region of the display; and
      generating for display the notification at the determined center point.

2. The method of claim 1, further comprising:
   generating for display a first media asset and a second media asset for viewing at the display by the first user and the second user, wherein the first region of the display corresponds to the first media asset and the second region of the display corresponds to the second media asset.

3. The method of claim 1, wherein identifying the notification that is relevant to the first user and the second user comprises:
   determining whether the notification corresponds to a type of social communication;
   in response to determining that the electronic message corresponds to the type of social communication:
      identifying one or more intended recipients of the social communication; and
      determining the one or more intended recipients of the social communication comprise the first user and the second user.

4. The method of claim 1, wherein identifying the notification that is relevant to the first user and the second user comprises:
   determining whether the notification corresponds to a type of a social communication;
   in response to determining that the notification does not correspond to a type of social communication:
      extracting a keyword from the notification; and
      for each of the first user and the second user:
         retrieving a respective user interest profile;
         comparing the keyword with the respective user interest profile; and
         determining, based on the comparing, that the notification is relevant to the first user and the second user.

5. The method of claim 4, wherein identifying the notification that is relevant to the first user and the second user further comprises:
   computing, based on the comparing, respective relevance scores for the first user and the second user; and
   determining that the notification is relevant to the first user and the second user based on the respective relevance scores.

6. The method of claim 5, wherein generating for display the notification in the third region of the display comprises:
   adjusting a position of the third region based on the respective relevance scores.

7. The method of claim 1, further comprising:
   determining whether the notification is related to private information of the first user or the second user; and
   refraining from generating for display the notification in response to determining the notification is related to private information of the first user or the second user.

8. The method of claim 1, further comprising:
   determining updated sets of lines of sights associated with the first user and the second user; and
   in response to determining the updated sets of lines of sights do not overlap with the region at which the notification is displayed, terminating the generating for display of the notification.

9. A computer-implemented system comprising:
   input/output circuitry;
   control circuitry configured to: determine that a first user and a second user are viewing a display;
   identify a notification that is relevant to the first user and the second user, wherein the notification is received via the input/output circuitry;
   determine a first line of sight associated with the first user and a second line of sight associated with the second user, wherein the first line of sight and the second line of sight point to a first region and a second region of the display, respectively;
   determine whether a third region of the display at which the first region and the second region overlap is present; and
   in response to determining the presence of the third region of the display at which the first region and the second region overlap, generate for display the notification in the third region of the display;
   in response to determining there is no third region of the display at which the first region and the second region overlap:
      determine a center point between the first region and the second region of the display; and
      generate for display the notification at the determined center point.

10. The system of claim 9, wherein the control circuitry is further configured to:
    generating for display a first media asset and a second media asset for viewing at the display by the first user and the second user, wherein the first region of the display corresponds to the first media asset and the second region of the display corresponds to the second media asset.

11. The system of claim 9, wherein the control circuitry is configured to identify the notification that is relevant to the first user and the second user by:

determining whether the notification corresponds to a type of social communication;
in response to determining that the electronic message corresponds to the type of social communication:
identifying one or more intended recipients of the social communication; and
determining the one or more intended recipients of the social communication comprise the first user and the second user.

12. The system of claim 9, wherein the control circuitry is configured to identify the notification that is relevant to the first user and the second user by:
determining whether the notification corresponds to a type of a social communication;
in response to determining that the notification does not correspond to a type of social communication:
extracting a keyword from the notification; and
for each of the first user and the second user:
retrieving a respective user interest profile;
comparing the keyword with the respective user interest profile; and
determining, based on the comparing, that the notification is relevant to the first user and the second user.

13. The system of claim 12, wherein the control circuitry is configured to identify the notification that is relevant to the first user and the second user by:
computing, based on the comparing, respective relevance scores for the first user and the second user; and
determining that the notification is relevant to the first user and the second user based on the respective relevance scores.

14. The system of claim 9, wherein the control circuitry is further configured to:
determine whether the notification is related to private information of the first user or the second user; and
refrain from generating for display the notification in response to determining the notification is related to private information of the first user or the second user.

15. The system of claim 9, wherein the control circuitry is further configured to:
determine updated sets of lines of sights associated with the first user and the second user; and
in response to determining the updated sets of lines of sights do not overlap with the region at which the notification is displayed, terminate the generating for display of the notification.

16. The system of claim 13, wherein the control circuitry configured to generate for display the notification in the third region of the display is further configured to:
adjust a position of the third region based on the respective relevance scores.

* * * * *